(12) United States Patent
Fuwa et al.

(10) Patent No.: US 7,441,522 B2
(45) Date of Patent: *Oct. 28, 2008

(54) VALVE CHARACTERISTIC CONTROL DEVICE FOR INTERNAL COMBUSTION ENGINE AND METHOD OF THE SAME

(75) Inventors: Naohide Fuwa, Toyota (JP); Hisayo Yoshikawa, Nagoya (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/295,466

(22) Filed: Dec. 7, 2005

(65) Prior Publication Data

US 2006/0124092 A1    Jun. 15, 2006

(30) Foreign Application Priority Data

Dec. 14, 2004 (JP) ............................. 2004-361358

(51) Int. Cl.
*F01L 1/34* (2006.01)

(52) U.S. Cl. .................. 123/90.16; 123/90.31; 123/346
(58) Field of Classification Search .............. 123/90.15, 123/90.16, 90.17, 90.18, 90.27, 90.31, 345, 123/346, 347, 348
See application file for complete search history.

(56) References Cited

U.S. PATENT DOCUMENTS 6,999,864 B2 * 2/2006 Iizuka et al. ................. 701/103
7,162,356 B2 * 1/2007 Fuwa et al. .................. 701/104

FOREIGN PATENT DOCUMENTS

JP    2001-263015    9/2001

* cited by examiner

*Primary Examiner*—Ching Chang
(74) *Attorney, Agent, or Firm*—Kenyon & Kenyon LLP

(57) ABSTRACT

A lift time area is calculated based on an actual valve working angle of an intake valve and an engine rotational speed. Then, a control gain of a feedback control is set based on the lift time area.

17 Claims, 6 Drawing Sheets

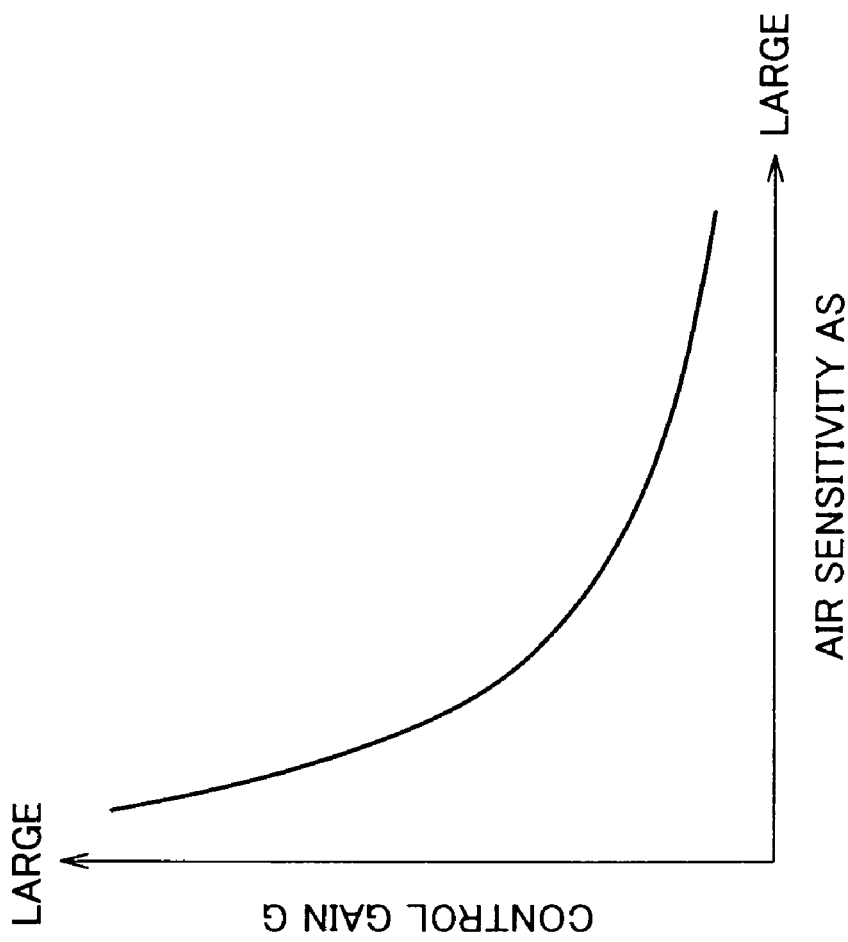

VALVE CHARACTERISTIC CONTROL DEVICE FOR INTERNAL COMBUSTION ENGINE AND METHOD OF THE SAME

INCORPORATION BY REFERENCE

The disclosure of Japanese Patent Application No. 2004-361358 filed on Dec. 14, 2004 including the specification, drawings and abstract is incorporated herein by reference in its entirety.

BACKGROUND OF THE INVENTION

1. Field of the Invention

The invention relates to a valve characteristic control device for an internal combustion engine including a variable valve mechanism that varies a lift time area of an intake valve, and a method of the same.

2. Description of the Related Art

Internal combustion engines including a variable valve mechanism that varies a valve characteristic of an intake valve, etc., are in practical use. Various types of variable valve mechanism are known, such as a variable valve timing mechanism that varies valve timing, a variable lift mechanism that varies a valve lift amount, and a mechanism described in Japanese Patent Application Publication No. JP 2001-263015 A that varies an opening period and a lift amount of a valve.

More specifically, with a variable valve mechanism that can continuously vary a valve lift amount and an opening timing of an intake valve, as described in Japanese Patent Application Publication No. JP 2001-263015 A, drive control of the variable valve mechanism can be performed to adjust an intake air amount. The intake air amount that changes along with variation of the valve characteristics has a correlation with an integral of the valve lift amount during a time period from when the intake valve is opened to when it is closed. Hereinafter, this type of time integral will be referred to as "lift time area". The variable valve mechanism as described in Japanese Patent Application Publication No. JP 2001-263015 A is able to vary a valve characteristic related to this lift time area, and thus vary a valve characteristic that is related to adjustment of the intake air amount.

Drive control of the above mechanism, namely, the variable valve mechanism that varies the valve characteristic related to the lift time area of the intake valve, may be performed to adjust the intake air amount of the internal combustion engine. In this case, drive of the variable valve mechanism is controlled in a feedback manner in order to make a present value of the valve characteristic become equal to a target value that is calculated based on an engine operating state. More particularly, a difference between the target value of the valve characteristic and the present value is used as a basis for performing feedback control of a drive amount of an actuator etc. that drives the variable valve mechanism. In this type of feedback control system, a control gain is set in order to achieve appropriate responsiveness and stability. The control gain is a value that adjusts the drive amount of the actuator etc. in accordance with the difference. As the value of the control gain increases, the drive amount increases, thereby increasing the responsiveness of the feedback control system. On the other hand, as the value of the control gain decreases, the drive amount also decreases, thereby increasing the stability of the feedback control system.

When the intake air amount of the engine is small, a ratio of the change of the intake air amount with respect to a change amount of the value characteristic increases. On the other hand, when the intake air amount is large, the change ratio has a tendency to decrease. This ratio of the change of the intake air amount with respect to the change amount of the valve characteristic will be referred to hereinafter as "air sensitivity". When the ratio of the change of the intake air amount with respect to the change amount of the valve characteristic is large, the air sensitivity is said hereinafter to be "high". On the other hand, when the ratio of the change of the intake air amount with respect to the change amount of the valve characteristic is small, the air sensitivity is said hereinafter to be "low".

The air sensitivity changes in accordance with the intake air amount as described above. Accordingly, if the control gain is set to a constant value, it is possible that the following problems will occur. When the air sensitivity is in a low region (a region where it is difficult for the air intake amount to change), the drive amount of the variable valve mechanism with respect to the change amount of the required intake air has a tendency to become insufficient. As a result, there is a possibility that responsiveness of the feedback control system will deteriorate and that problems will occur like, for example, change of the intake air amount becoming slow. On the other hand, when the air sensitivity is in a high region (a region where it is easy for the intake air amount to change), the drive amount of the variable valve mechanism with respect to the change amount of the required intake air becomes excessive. Accordingly, there is a possibility that stability of the feedback control system will deteriorate and that problems will occur like, for example, overshoot of the intake air amount causing the engine to stall.

SUMMARY OF THE INVENTION

It is an object of the invention to provide a valve characteristic control device for an internal combustion engine that appropriately sets a control gain of a feedback control when a variable valve mechanism is controlled in a feedback manner in order to favorably ensure responsiveness and stability of a feedback control system. The invention also provides a method of the same.

A first aspect of the invention relates to a device that is applied to an internal combustion engine including a variable valve mechanism that varies a valve characteristic of an intake valve, the valve characteristic being related to a lift time area of the intake valve. The device performs feedback control of the variable valve mechanism based on a difference between a target value and a present value of the valve characteristic, and includes: an air sensitivity calculation means for calculating an air sensitivity of a present value of the lift time area; and a control gain setting means for setting a control gain of the feedback control in accordance with the calculated air sensitivity.

The inventors have realized that air sensitivity, a term that indicates a ratio of a change in an intake air amount with respect to a change amount of a valve characteristic, can be fundamental derived based on a lift time area of the intake valve (a time integral of a valve lift amount during a period between when the intake valve opens to when the intake valve closes). Accordingly, according to the first aspect, the air sensitivity calculation means calculates the air sensitivity of the present value of the lift time area, and the control gain setting means sets the control gain of the feedback control in accordance with the calculated air sensitivity More specifically, the air sensitivity is calculated based on the lift time area and the control gain is variably set in accordance with the calculated air sensitivity. As a result, when feedback control of the variable valve mechanism is performed, the control gain of the feedback control can be appropriately set, whereby responsiveness and stability of the feedback control system can be favorably ensured. Note that, the valve characteristic of the intake valve related to the lift time area of the intake valve may be, for example, a valve lift amount of the intake valve, an opening period of the intake valve, or the like.

A second aspect of the invention relates to a device that is applied to an internal combustion engine including a variable valve mechanism that varies a valve characteristic of an intake valve, the valve characteristic being related to a lift time area of the intake valve. The device performs feedback control of the variable valve mechanism based on a difference between a target value and a present value of the valve characteristic, and includes: a setting means for setting a control gain of the feedback control in accordance with a present value of the lift time area such that the control gain decreases as the present value of the lift time area decreases.

As described previously, the air sensitivity can be derived based on the lift time area of the intake valve alone. More specifically, the inventors have realized that the air sensitivity becomes higher as the lift time area decreases. Given this fact, in the second aspect, the control gain of the feedback control is set in accordance with the present value of the lift time area such that the control gain decreases as the present value of the lift time area decreases. Thus, the control gain is variably set to become smaller as the lift time area decreases, namely, as the air sensitivity becomes higher (the ratio of the change of the intake air amount with respect to the change amount of the lift time area increases). As a result, the drive amount of the variable valve mechanism decreases. Thus, when the air sensitivity is in a high region, it is possible to suppress excessive change of the intake air amount from occurring, such as when, for example, the intake air amount overshoots. As a result, stability of the feedback control system can be reliably improved.

A third aspect of the invention relates to a valve characteristic control method for an internal combustion engine including a variable valve mechanism that varies a valve characteristic of an intake valve, the valve characteristic being related to a lift time area of the intake valve. This method includes performing feedback control of the variable valve mechanism based on a difference between a target value and a present value of the valve characteristic; calculating a present value of the lift time area; and setting a control gain of the feedback control based on the calculated present value of the lift time area.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 6 is a conceptual diagram showing an example of a set state of a control gain setting map.

DETAILED DESCRIPTION OF THE PREFERRED EMBODIMENTS

Figure 1:
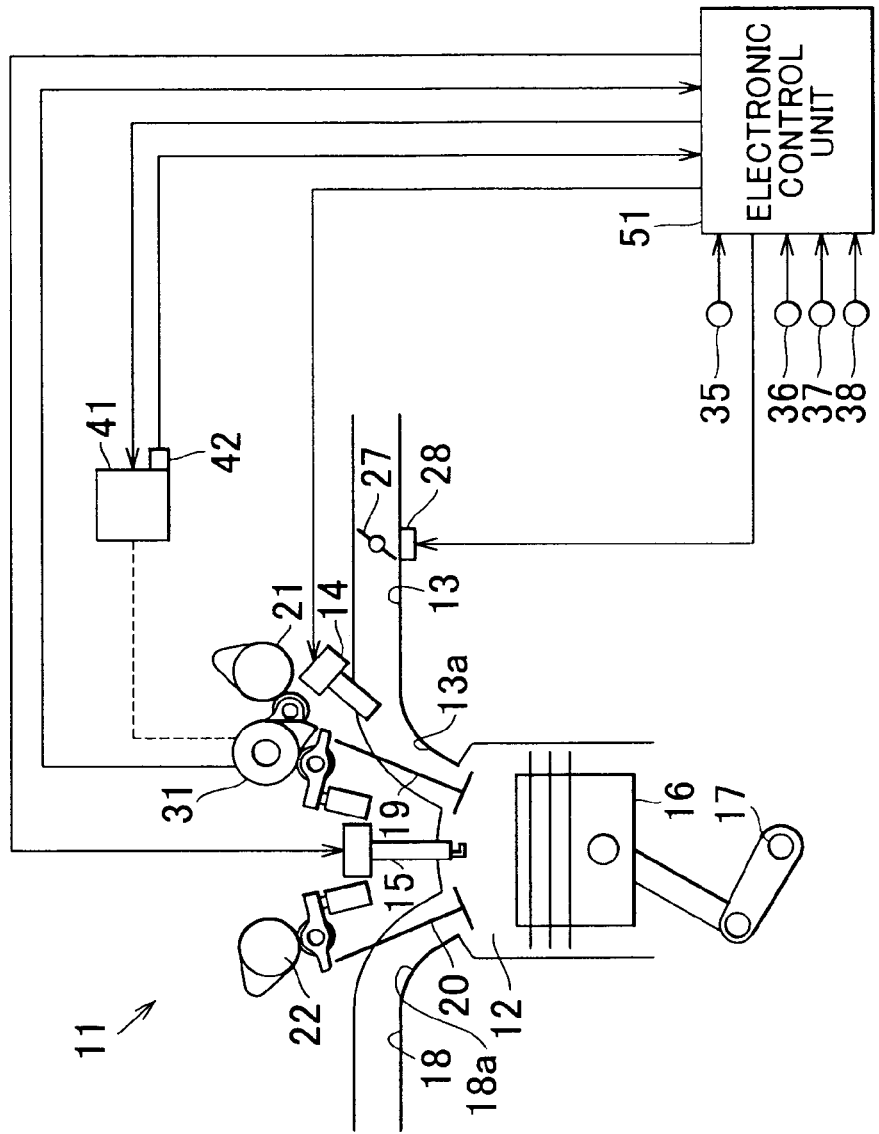
FIG. 1 is an outline view showing a configuration of an engine to which a concrete embodiment of a valve characteristic control device for an internal combustion engine according to the invention is applied.

As shown in FIG. 1, an engine 11 is provided with a combustion chamber 12. Air is intaken to the combustion chamber 12 via an intake passage 13 and an intake port 13a. A fuel injection valve 14 provided in the intake passage 13 injects an amount of fuel that accords with the intake air amount. The air-fuel mixture formed from the fuel and air is ignited by a spark from a spark plug 15, whereby the air-fuel mixture combusts and causes a piston 16 to move reciprocally. As a result, an engine output shaft, namely, a crank shaft 17, is rotated. Moreover, following combustion, the air-fuel mixture is discharged as exhaust gas from the combustion chamber 12 to an exhaust passage 18 via the exhaust port 18a.

A throttle valve 27 for adjusting the intake air amount is provided in the intake passage 13. An opening degree of the throttle valve 27 is adjusted using drive control of a motor 28. An intake valve 19 is opened and closed to enable communication and separation of the intake port 13a and the combustion chamber 12. An exhaust valve 20 is opened and closed to enable communication and separation of an exhaust port 18a and the combustion chamber 12. Rotation of the crank shaft 17 is transmitted to an intake cam shaft 21 and an exhaust cam shaft 22. The intake valve 19 and the exhaust valve 20 are driven to open and close along with rotation of an intake cam shaft 21 and an exhaust cam shaft 22.

A variable valve mechanism 31 is provided between the intake cam shaft 21 and the intake valve 19. This variable valve mechanism 31 varies a lift amount (more specifically a maximum lift amount) of the intake valve 19 and an opening timing of the intake valve 19. A rotation angle of the crank shaft 17 that rotates while the intake valve 19 is open will be referred to hereinafter as a "valve working angle". Note that, since the valve working angle corresponds to the opening period of the intake valve 19, the valve working angle can be changed by the variable valve mechanism 31.

The maximum lift amount and the valve working angle are variably controlled by driving the variable valve mechanism 31 using an electric motor 41, and, for example, are set to control target values that are calculated based on an operation amount or the like of an accelerator pedal. An actual valve working angle VR, which is the actual valve working angle of the intake valve 19, is ascertained based on a detection signal from a drive amount detection sensor 42 that detects a drive amount of the electric motor 41.

Figure 2:
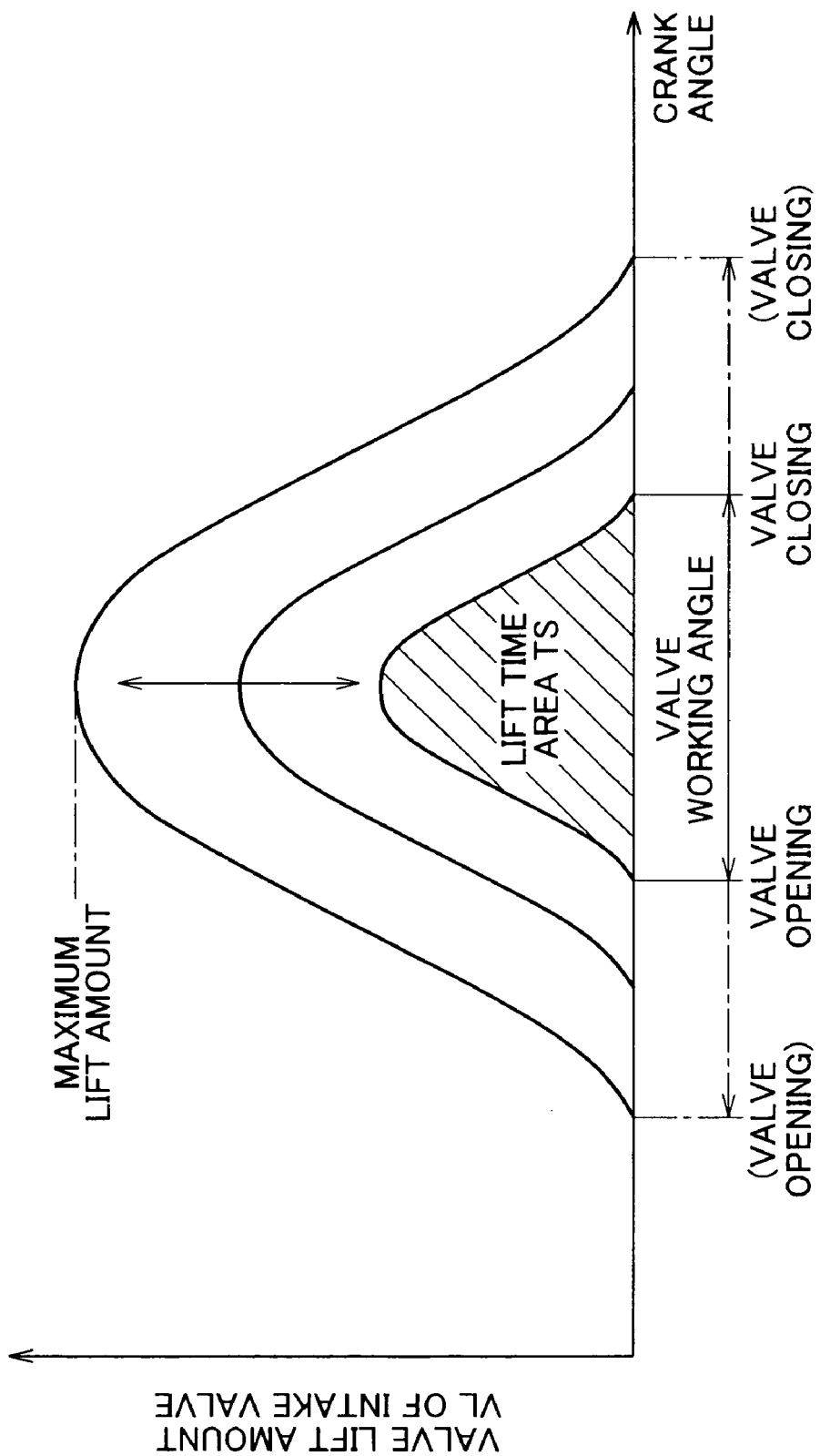
FIG. 2 is a graph showing respective changes of a maximum lift amount and a valve working angle of an intake valve resulting from drive of a variable valve mechanism.

FIG. 2 is a graph showing respective changes of the maximum lift amount and the valve working angle resulting from drive of the variable valve mechanism 31. As can be understood from the characteristic curves shown in FIG. 2, the maximum lift amount and the valve working angle change synchronously with each other such that, for example, as the valve working angle increases the maximum lift amount increases. The fact that the valve working angle increases indicates that the opening timing of the intake valve 19 has been changed to the advanced side, and that the closing timing thereof has been changed to the retard side. In other words, increase of the working angle indicates that the opening and closing timings have been changed to be further apart, and that the opening period of the intake valve 19 has been lengthened. In addition, increase of the maximum lift amount and the valve working angle is synchronously accompanied by increase of a time integral of a valve lift amount VL from when the intake valve 19 opens to when it closes, namely, a lift time area TS (an area of the section marked with diagonal lines in FIG. 2). Further, increase of the lift time area TS is accompanied by increase of the intake air amount.

Moreover, in this embodiment, the maximum lift amount and the valve working angle can be changed continuously between the different characteristic curves shown in FIG. 2 by driving the variable valve mechanism 31 using the electric motor 41. Adjustment of the intake air amount in accordance with the engine operating state can be performed by changing the lift time area TS through variable control of the valve working angle of the intake valve 19, and by performing opening degree control of the throttle valve 27.

Note that, when the intake air amount that is intaken to the combustion chamber 12 is decreased by reducing the maximum lift amount, it is possible to make pumping loss smaller as compared to when the intake air amount is reduced by the reducing the opening degree of the throttle valve 27. Accordingly, output loss of the engine 11 can be inhibited, and fuel consumption improvement promoted.

Various sensors for detecting the engine operating state are provided in the engine 11. For example, a crank angle sensor 35 detects a rotational phase, namely, a crank angle, of the crank shaft 17. A detection signal of the crank angle sensor 35 is used to calculate an engine rotational speed NE. An accelerator sensor 36 detects a depression amount (an accelerator operation amount ACCP) of the accelerator pedal, and the throttle sensor 37 detects the opening degree (a throttle opening degree TA) of the throttle valve 27. An air intake amount sensor 38 detects an intake air amount GA that is introduced to the combustion chamber 12.

Various types of control of the engine 11 are performed by an electronic control unit 51. This electronic control unit 51 is configured with a microcomputer as a main structural element, and is input with the respective detection signals from the various sensors described above. A central processing unit (CPU) of the electronic control unit 51 uses these detection signals as a basis for performing calculation processing in accordance with various control programs, initial data and control maps, etc., stored in a read-only memory (ROM). The CPU performs various controls based on the obtained calculation results. More specifically, the CPU performs spark timing control of the spark plug 15, fuel injection control of the fuel injection valve 14, and opening degree control of the throttle valve 27 that is carried out by controlling the motor 28. The CPU also performs control of the valve working angle of the intake valve 19 by controlling the electric motor 41, and the like.

As described previously, in this embodiment, the variable valve mechanism 31 varies the valve characteristic (the maximum lift amount or the valve opening period) related to the lift time area TS of the intake valve 19. Drive control of this variable valve mechanism 31 is performed to adjust the intake air amount of the engine 11. When adjusting the intake air amount, feedback control of the drive of the variable valve mechanism 31 is performed in order to make the present value of the valve characteristic equal to the target value calculated based on the engine operating state.

More specifically, a difference ΔVR between (i) the actual valve working angle VR that is the present value of the valve working angle related to the lift time area TS, and (ii) a target valve working angle VP that is calculated based on the accelerator operating amount ACCP, the engine rotational speed NE, etc. is obtained. This difference ΔVR is used as a basis for performing feedback control of the drive amount of the electric motor 41 that drives the variable valve mechanism 31. In this type of feedback control system, a control gain G is set in order to achieve appropriate responsiveness and stability of the system. This control gain G is a value that adjusts the drive amount of the electric motor 41 in accordance with the difference ΔVR. As the value of the control gain G increases, the drive amount also increases, thereby increasing the responsiveness of the feedback control system. On the other hand, as the value of the control gain G decreases, the drive amount also decreases, thereby increasing the stability of the feedback control system. The drive amount of the electric motor 41 may be obtained using the following Expression (1), which is based on the control gain G and the difference ΔVR.

$$\text{Drive amount} = \text{difference } \Delta VR \times \text{control gain } G \qquad (1)$$

When the intake air amount of the engine 11 is small, a ratio of the change of the intake air amount with respect to a change amount of the valve characteristic of the intake valve 19 increases. On the other hand, when the intake air amount is large, the change ratio has a tendency to decrease. This ratio of the change of the intake air amount with respect to the change amount of the valve characteristic will be referred to hereinafter as "air sensitivity". When the ratio of the change of the intake air amount with respect to the change amount of the valve characteristic is large, the air sensitivity is said hereinafter to be "high". On the other hand, when the ratio of the change of the intake air amount with respect to the change amount of the valve characteristic is small, the air sensitivity is said hereinafter to be "low".

The air sensitivity changes in accordance with the intake air amount as described above. Accordingly, if the control gain G is set to a constant value, it is possible that the following problems will occur. When the air sensitivity is in a low region (a region where it is difficult for the air intake amount to change), the drive amount of the variable valve mechanism 31 with respect to the change amount of the required intake air has a tendency to become insufficient. As a result, there is a possibility that responsiveness of the feedback control system will deteriorate and that problems will occur like, for example, change of the intake air amount becoming slow. On the other hand, when the air sensitivity is in a high region (a region where it is easy for the intake air amount to change), the drive amount of the variable valve mechanism 31 with respect to the change amount of the required intake air becomes excessive. Accordingly, there is a possibility that stability of the feedback control system will deteriorate and that problems will occur like, for example, overshoot of the intake air amount causing the engine 11 to stall.

However, the inventors have realized that the air sensitivity can be derived based on the lift time area TS of the intake valve 19 alone, and, more particularly, that decrease of the lift time area TS is accompanied by increase of the air sensitivity. More particular, Accordingly, in this embodiment, an air sensitivity AS is calculated based on the lift time area TS, and a control gain setting process for variably setting the control gain G in accordance with the calculated air sensitivity AS is performed. As a result of performing this setting processing, it is possible to appropriately set the control gain G when the drive of the variable valve mechanism 41 is controlled in a feedback manner. Thus, responsiveness and stability of the feedback control system can be favorably ensured.

Figure 3:
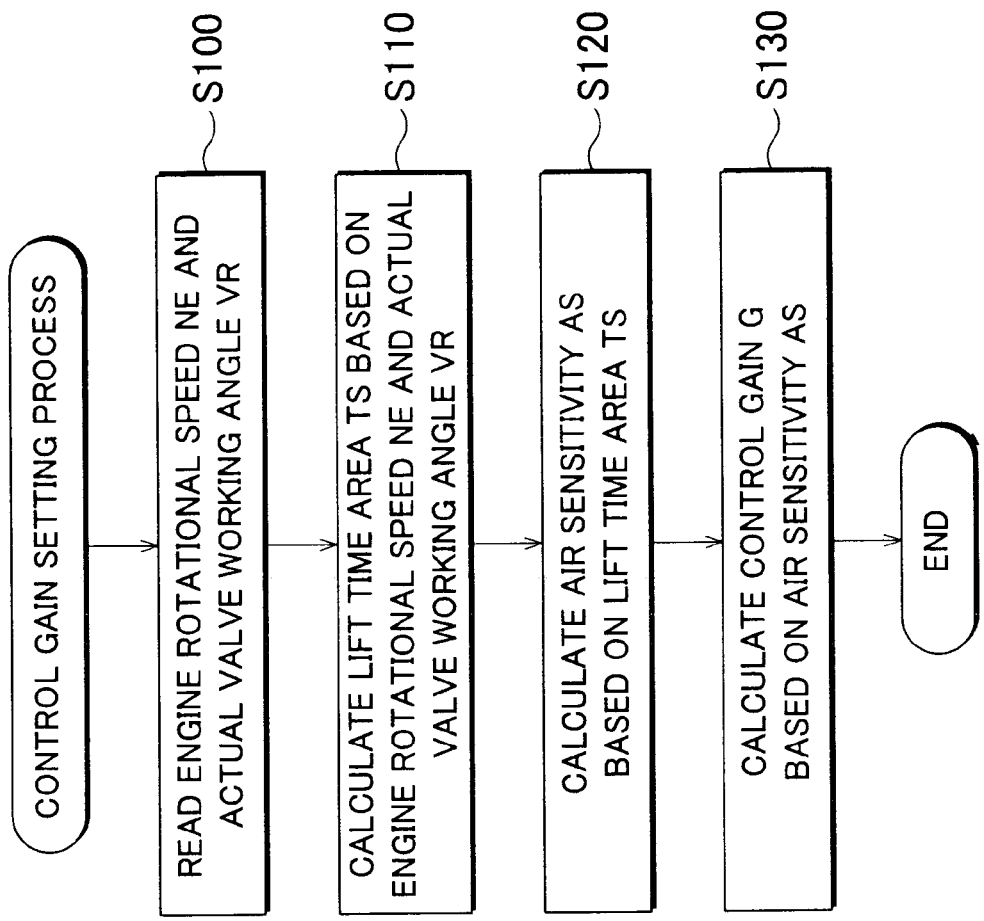
FIG. 3 is a flow chart showing a procedure of a control gain setting process of the embodiment.

FIG. 3 shows a procedure of the setting process for the control gain G of the embodiment. This process is performed repeatedly at a predetermined time interval by the electronic control unit 51. When the process begins, first, the present engine rotational number NE and the actual valve working angle VR are read (S100).

Next, the present value of the lift time area TS in the present processing cycle is calculated based on the engine rotational speed NE and the actual valve working angle VR (step S110). The calculation of the lift time area TS is performed in the following manner.

Figure 4:
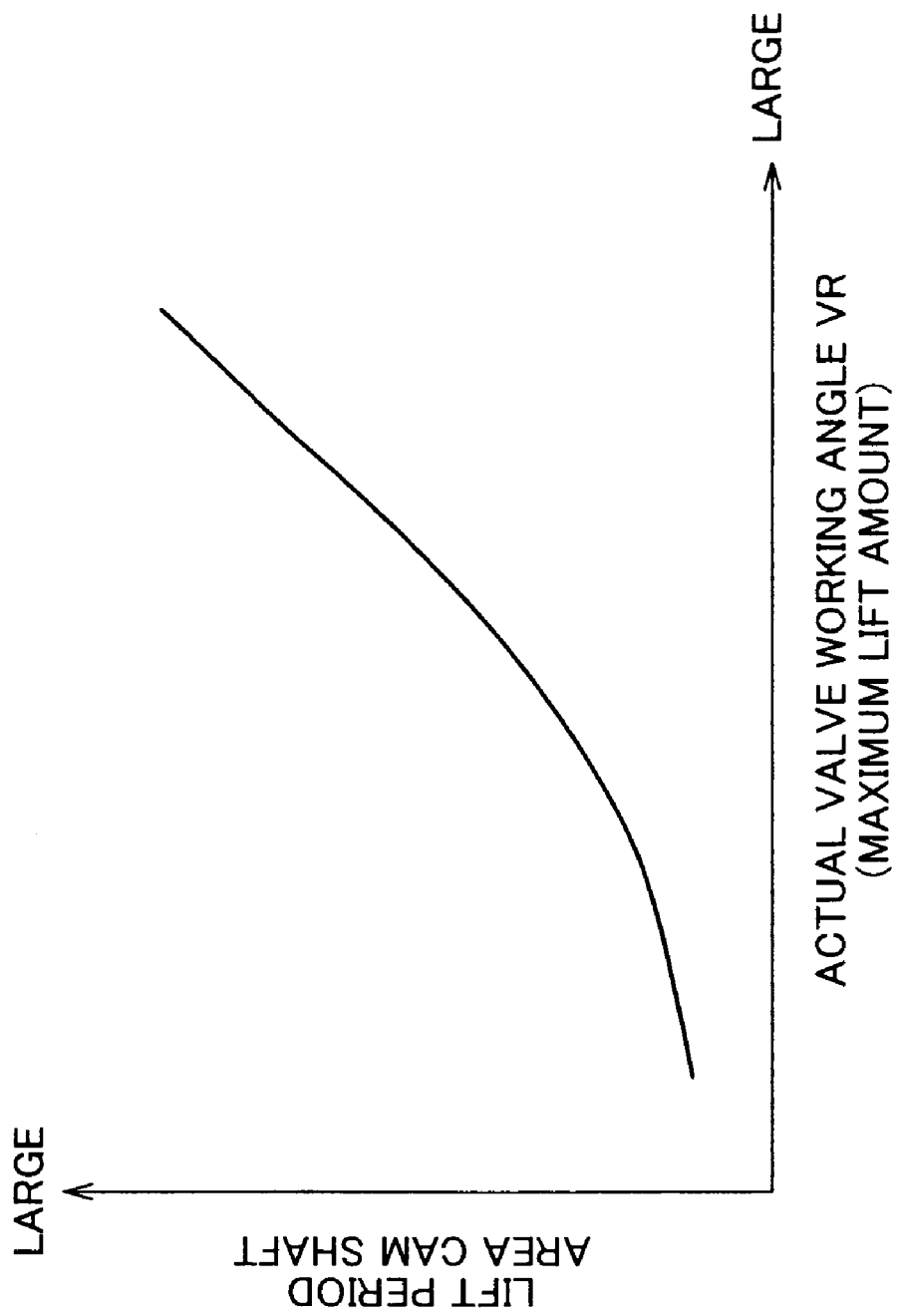
FIG. 4 is a conceptual diagram showing an example of a set state of a lift period area calculation map.

As described above, the actual valve working angle VR corresponds with the opening period of the intake valve 19, and the maximum lift amount and the lift time area TS change synchronously with change of the actual valve working angle VR. Accordingly, an integral of the valve lift amount VL (hereinafter referred to as "lift period area CS") during the opening period of the intake valve 19 that is apparent from the crank angle can be derived based on the actual valve working angle VR alone. Accordingly, first, a lift period area calculation map stored in the ROM of the electronic control unit 51 is referred to, and the lift period area CS is derived in accordance with the actual valve working angle VR. Note that, as described above, as the valve working angle increases, the opening period and the maximum lift amount of the intake valve 19 increase. Accordingly, in the lift period area calculation map shown in the example of FIG. 4, the derived lift period area CS is set to increase as the actual valve working angle VR increases. Next, the lift period area CS that is the integral of the crank angle and the valve lift amount VL is converted to a lift time using the engine rotational speed NE, and the lift time area TS is calculated that is the integral of the opening timing of the intake valve 19 and the valve lift amount VL.

Figure 5:
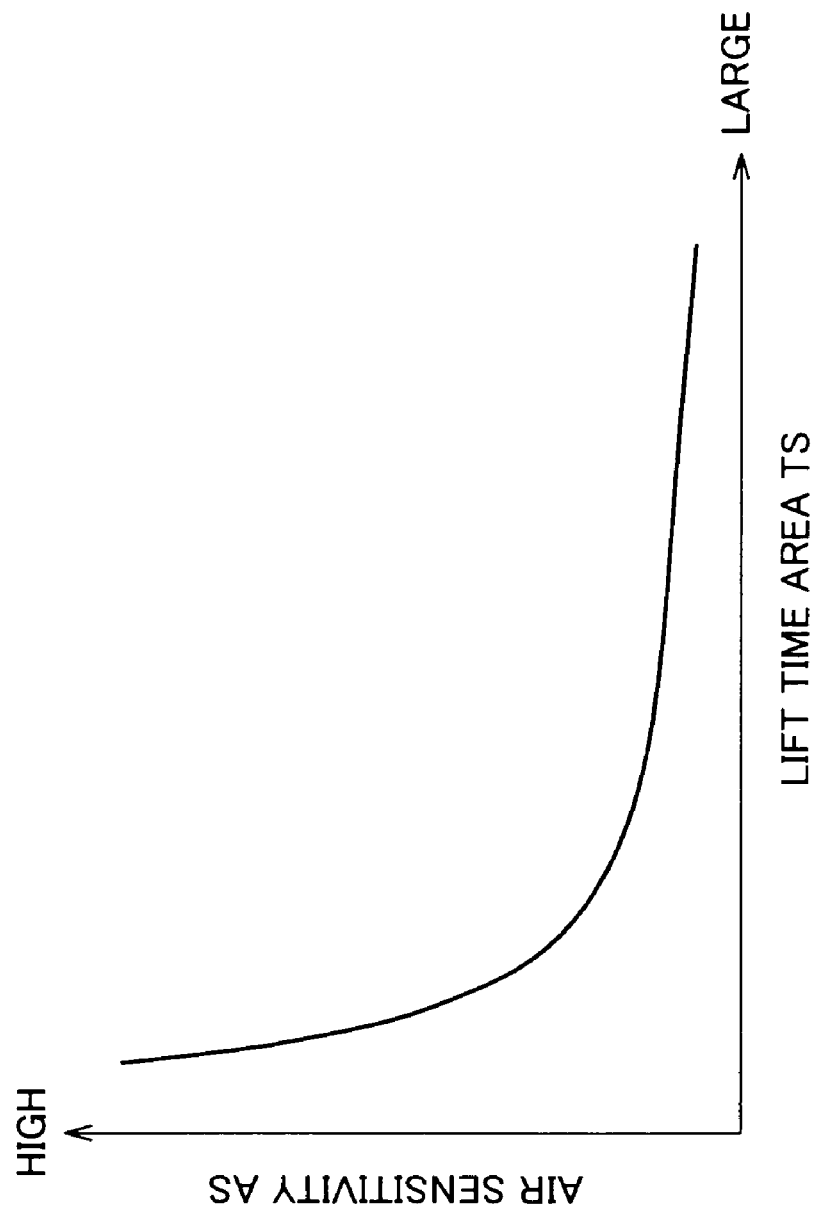
FIG. 5 is a conceptual diagram showing an example of a set state of an air sensitivity calculation map.

Once the lift time area TS has been calculated in the above described manner, an air sensitivity calculation map stored in the ROM of the electronic control unit 51 is referred to, and the air sensitivity AS that corresponds to the present value of the lift time area TS is derived (step S120). As described above, the air sensitivity AS can be derived based on the lift time area TS alone. More particularly, the inventors have realized that the air sensitivity AS becomes higher as the lift time area TS decreases. Accordingly, the air sensitivity calculation map, as can be seen from the example shown in FIG. 5, is set such that the derived air sensitivity AS becomes higher as the lift time area TS decreases. In other words, the map is set such that the derived air sensitivity AS becomes lower as the lift time area TS increases. Note that, step S120 corresponds to air sensitivity calculation means of the invention. Further, in this embodiment, the air sensitivity AS is taken to be a value defined by Expression (2) below. However, so long as a value is used for the air sensitivity AS that expresses the ratio of the change of the intake air amount with respect to the change amount of the valve characteristic, the air sensitivity AS may be defined in any appropriate way.

$$\text{Air sensitivity } AS = (\Delta GA/GA)/\Delta TS \quad (2)$$

ΔGA: The change amount of the intake air amount that accompanies change of lift time area TS GA: The intake air amount prior to change of the lift time area TS ΔTS: The change amount of the lift time area TS Next, a control gain setting map stored in the ROM of the electronic control unit 51 is referred to, and the control gain G that accords with the air sensitivity AS is calculated (step S130). Then, the processing is terminated. The control gain setting map, as can be seen from the example of FIG. 6, is set such that the derived control gain G increases as the air sensitivity AS becomes lower. Viewed from the opposite perspective, the map is set such that the derived control gain G decreases as the air sensitivity AS becomes higher. Note that, step S130 corresponds to control gain setting means.

The control gain setting process is performed repeatedly at a predetermined time interval. Accordingly, the control gain G is set in accordance with the air sensitivity AS each time the processing cycle is performed. This set control gain G is then utilized in the feedback control of the variable valve mechanism 31.

In this embodiment, the control gain G is set to increase as the air sensitivity AS becomes lower. As a result, when the air sensitivity AS is low, for example, when the engine operating state is in a high rotation/high load region in which the air intake amount is large, the drive amount of the variable valve mechanism 31 increases as the change amount of the intake air with respect to the drive amount of the variable valve mechanism 31 decreases. In other words, as the ratio of the change of the intake air amount with respect to the change amount of the lift time area TS decreases, the drive amount of the variable valve mechanism 31 increases. Thus, the change amount of the intake air can be set larger even when the air sensitivity AS is in the low region, namely, in a region where responsiveness of the feedback control system is liable to deteriorate. As a result, responsiveness of the feedback control system can be reliably improved.

In addition, the control gain G is set to decrease as the air sensitivity AS becomes higher. Accordingly, when the air sensitivity AS is high, for example, when the engine operating state is in a low rotation/low load region where the air intake amount is small, the drive amount of the variable valve mechanism 31 decreases as the change amount of the intake air with respect to the drive amount of the variable valve mechanism 31 increases. In other words, the drive amount of the variable valve mechanism 31 decreases as the ratio of the change of the intake air amount with respect to the change amount of the lift time area TS increases. Accordingly, when the air sensitivity AS is in a high region, namely, in a region where the stability of the feedback control system is liable to deteriorate, it is possible to suppress excessive change of the intake air amount from occurring, such as when, for example, the intake air amount overshoots. As a result, stability of the feedback control system can be reliably improved.

As has been described above, according to the embodiment, the following effects can be obtained.

(1) The inventors have realized that the air sensitivity AS can be derived based on the lift time area TS of the intake valve 19 alone. Thus, the air sensitivity AS is calculated based on the lift time area TS, and then the control gain G is variably set in accordance with the calculated air sensitivity AS. Accordingly, when feedback control of the variable valve mechanism 31 is performed, the control gain G of the feedback control can be set appropriately, whereby responsiveness and stability of the feedback control system can be favorably ensured.

(2) When the control gain G is set in accordance with the air sensitivity AS, the control gain G is set to increase as the air sensitivity becomes lower. Accordingly, even when the air sensitivity AS is in the low region, namely, even in the region where responsiveness of the feedback control system is liable to deteriorate, the change amount of the intake air amount can be set to be larger. As a result, responsiveness of the feedback control system can be reliably improved.

In addition, the control gain G is set to increase as the air sensitivity AS becomes lower, or, in other words, the control gain G is set to decrease as the air sensitivity AS becomes higher. Thus, when the air sensitivity AS is in the high region, namely, in the region where the stability of the feedback control system is liable to deteriorate, it is possible to suppress excessive change of the intake air amount from occurring, such as when, for example, the intake air amount overshoots. As a result, stability of the feedback control system can be reliably improved.

The above embodiment may be modified in the following ways. As described above, the valve working angle and the maximum lift amount change synchronously. Accordingly, in the embodiment, the drive of the variable valve mechanism is controlled based on the valve working angle. However, the variable valve mechanism may be controlled based on the maximum lift amount.

Moreover, in the above embodiment, the lift period area CS is derived based on the actual valve working angle VR. However, the lift period area CS may be derived based on the maximum lift amount. Further, in the above embodiment, the lift period area CS, the air sensitivity AS, and the control gain G are derived by referring to the respective maps. However, function expressions or the like may be used instead.

The lift time area calculation map of the above embodiment may be configured such that the lift time area TS is divided into a plurality of regions, with a different air sensitivity AS being calculated for each region. Further, the control gain setting map of the above embodiment may be configured such that the air sensitivity AS is divided into a plurality of regions, with a different control gain G being set for each region.

In the above embodiment, the control gain G may be set to be inversely proportional to the air sensitivity AS. In this case, the control gain G increases as the air sensitivity AS becomes lower, and the control gain G decreases as the air sensitivity AS becomes higher. Accordingly, the same effects as those of the above embodiment can be obtained.

The invention can be applied in a similar manner to above to an engine in which so called idle rotational speed control is performed by controlling the variable valve mechanism 31 in a feedback manner. In this idle rotational speed control, speed is maintained at a constant engine rotational speed when the engine is idling. In this case, when feedback control of the variable valve mechanism 31 is performed, the control gain of the feedback control can be appropriately set. As a result, it is possible to favorably ensure responsiveness and stability of the feedback control system when control of the idle rotational speed is performed.

In the above embodiment, the air sensitivity AS is calculated based on the lift time area TS, and the control gain G is set based on the air sensitivity AS. However, as described above, the inventors have realized that the lift time area TS and the air sensitivity AS are fundamentally related, and that the lift time area TS decreases as the air sensitivity AS becomes higher. Given this fact, the control gain G may be set in the following manner. The control gain G of the feedback control may be set in accordance with the present value of the lift time area TS such that the control gain G decreases as the present value of the lift time area TS decreases. In other words, the control gain G may be directly set based on the lift time area TS.

With this configuration, the control gain G is variably set to decrease as the lift time area TS decreases, namely, as the air sensitivity AS becomes higher (namely, as the ratio of the change of the intake air amount with respect to the change amount of the lift time area TS becomes larger), whereby the drive amount of the variable valve mechanism 31 decreases. As a result, when the air sensitivity AS is in the high region, it is possible to suppress excessive change of the intake air amount from occurring, such as when, for example, the intake air amount overshoots. Thus, stability of the feedback control system can be reliably improved.

In this modified example, the control gain G is set in accordance with the present value of the lift time area TS such that the control gain G of the feedback control decreases as the present value of the lift time area TS decreases. In other words, the control gain G is set in accordance with the present value of the lift time area TS such that the control gain G of the feedback control increases as the present value of the lift time area TS increases. Accordingly, the control gain G is variably set to increase as the lift time area TS increases, namely, as the air sensitivity AS becomes lower (namely, as the ratio of the change of the intake air amount with respect to the change amount of the lift time area TS becomes smaller), whereby the drive amount of the variable valve mechanism 31 increases. As a result, even when the air sensitivity AS is in the low region, the change amount of the intake air can be set to be larger, and thus responsiveness of the feedback control system can be reliably improved.

Accordingly, with the above modified examples as well, the control gain of the feedback control can be appropriately set when the variable valve mechanism is controlled in a feedback manner. Thus, responsiveness and stability of the feedback control system can be favorably ensured. In addition, in the modified examples, setting of the control gain is directly based on the lift time area. As a result, the control gain can be set using a configuration that is simple as compared to that utilized in the described embodiment where the air sensitivity is calculated and used as a basis for setting the control gain The variable valve mechanism 31 of the embodiment is a mechanism that variably changes the maximum lift amount and the valve working angle of the intake valve 19. However, the invention can be applied in a similar manner so long as a variable valve mechanism is provided that can vary, at the least, one of the maximum lift amount and the valve working angle of the intake valve 19.

What is claimed is:

1. A valve characteristic control device for an internal combustion engine including a variable valve mechanism that varies a valve characteristic of an intake valve, the valve characteristic being related to a lift time area of the intake valve, comprising:
   a control unit that performs feedback control of the variable valve mechanism based on a difference between a target value and a present value of the valve characteristic;
   a calculation unit that calculates an air sensitivity of a present value of the lift time area; and
   a setting unit that sets a control gain of the feedback control in accordance with the calculated air sensitivity.

2. The valve characteristic control device according to claim 1, wherein the setting unit sets the control gain to become larger as the air sensitivity becomes lower.

3. The valve characteristic control device according to claim 1, wherein the setting unit sets the control gain to be inversely proportional to the air sensitivity.

4. The valve characteristic control device according to claim 1, wherein the valve characteristic is at least one of a maximum lift amount and a valve working angle.

5. The valve characteristic control device according to claim 1, wherein the calculation unit calculates the air sensitivity based on the present value of the valve characteristic.

6. The valve characteristic control device according to claim 1, wherein the control unit sets a drive amount of the variable valve mechanism according to the control gain of the feedback control and the difference between the target value and the present value of the valve characteristic.

7. A valve characteristic control device for an internal combustion engine including a variable valve mechanism that varies a valve characteristic of an intake valve, the valve characteristic being related to a lift time area of the intake valve, comprising:

a control unit that performs feedback control of the variable valve mechanism based on a difference between a target value and a present value of the valve characteristic; and a setting unit that sets a control gain of the feedback control in accordance with a present value of the lift time area such that the control gain decreases as the present value of the lift time area decreases.

8. The valve characteristic control device according to claim 7, wherein the valve characteristic is at least one of a maximum lift amount and a valve working angle.

9. A valve characteristic control method for an internal combustion engine including a variable valve mechanism that varies a valve characteristic of an intake valve, the valve characteristic being related to a lift time area of the intake valve, comprising:

performing feedback control of the variable valve mechanism based on a difference between a target value and a present value of the valve characteristic;

calculating a present value of the lift time area;

setting a control gain of the feedback control based on the calculated present value of the lift time area; and calculating an air sensitivity using the present value of the valve characteristic, and setting of the control gain is based on the calculated air sensitivity.

10. The valve characteristic control method according to claim 9, wherein the control gain is set larger as the air sensitivity becomes lower.

11. The valve characteristic control method according to claim 9, wherein the control gain is set to be inversely proportional to the air sensitivity.

12. A valve characteristic control method for an internal combustion engine including a variable valve mechanism that varies a valve characteristic of an intake valve, the valve characteristic being related to a lift time area of the intake valve, comprising:

performing feedback control of the variable valve mechanism based on a difference between a target value and a present value of the valve characteristic;

calculating a present value of the lift time area; and setting a control gain of the feedback control based on the calculated present value of the lift time area, wherein the control gain is set smaller as the present value of the lift time area decreases.

13. The valve characteristic control method according to claim 12, wherein the valve characteristic is one of a maximum lift amount and a valve working angle.

14. A valve characteristic control method for an internal combustion engine including a variable valve mechanism that varies a valve characteristic of an intake valve, the valve characteristic being related to a lift time area of the intake valve that is an integral of the valve lift amount during a time period from when intake valve is open to when it is closed, comprising:

performing feedback control of the variable valve mechanism based on a difference between a target value and a present value of the valve characteristic;

calculating a present value of the lift time area; and setting a control gain of the feedback control based on the calculated present value of the lift time area.

15. The valve characteristic control method according to claim 14, wherein calculating an air sensitivity using the present value of the valve characteristic, and setting of the control gain is based on the calculated air sensitivity.

16. The valve characteristic control method according to claim 15, wherein the control gain is set larger as the air sensitivity becomes lower.

17. The valve characteristic control method according to claim 15, wherein the control gain is set to be inversely proportional to the air sensitivity.

* * * * *